United States Patent
Gaessler et al.

(10) Patent No.: US 6,681,729 B2
(45) Date of Patent: Jan. 27, 2004

(54) METHOD AND DEVICE FOR CONTROLLING A GAS FILL OF CYLINDERS OF AN INTERNAL COMBUSTION ENGINE

(75) Inventors: Hermann Gaessler, Vaihingen (DE); Udo Diehl, Stuttggart (DE); Karsten Mischker, Leonberg (DE); Rainer Walter, Pleidelsheim (DE); Bernd Rosenau, Tamm (DE); Juergen Schiemann, Markgroeningen (DE); Christian Grosse, Kornwestheim (DE); Georg Mallebrein, Korntal-Muenchingen (DE); Volker Beuche, Stuttgart (DE); Stefan Reimer, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 10/034,962

(22) Filed: Dec. 26, 2001

(65) Prior Publication Data

US 2002/0166539 A1 Nov. 14, 2002

(30) Foreign Application Priority Data

Dec. 22, 2000 (EP) .............................................. 10064651

(51) Int. Cl.[7] .............................. F02D 13/00; F01L 1/34

(52) U.S. Cl. .................................... 123/90.11; 123/404
(58) Field of Search .......................... 123/90.11, 90.12, 123/90.15, 399, 403, 404

(56) References Cited

U.S. PATENT DOCUMENTS 4,296,911 A * 10/1981 Escobosa ..................... 251/57
5,404,844 A * 4/1995 Schechter ................. 123/90.12
5,419,301 A * 5/1995 Schechter .................... 123/673

FOREIGN PATENT DOCUMENTS

DE        42 36 008      4/1994
DE        195 11 320     10/1995

* cited by examiner

Primary Examiner—Mahmoud Gimie
(74) Attorney, Agent, or Firm—Kenyon & Kenyon (57) ABSTRACT

A method and a device for controlling a gas fill of a plurality of cylinders in an internal combustion engine having variable valve timing, in which a detection signal of a filling sensor is sampled with a sampling rate. Furthermore, a detection interval is determined for one cylinder. The sampling values for ascertaining a sampling-value sum are added up within this detection interval. In addition, a number of sampling values within the first detection interval are counted for ascertaining a first count value. The air mass filled into the first cylinder is then ascertained by forming a quotient from the sampling-value sum and the count value.

22 Claims, 7 Drawing Sheets

METHOD AND DEVICE FOR CONTROLLING A GAS FILL OF CYLINDERS OF AN INTERNAL COMBUSTION ENGINE

FIELD OF THE INVENTION

The present invention relates to a method and a device for controlling a gas fill of a plurality of cylinders in an internal combustion engine having variable valve timing.

BACKGROUND INFORMATION

Conventional internal combustion engines have one or more camshafts for controlling the engine valves with a predefined lifting curve. The lifting curve of valve actuators of the engine valves is defined by the design of the camshaft. However, a defined lifting curve does not permit optimal operation of the internal combustion engine in each operating state, since in general, different operating states of the internal combustion engine require different lifting curves.

Because of the fixed lifting curve, control of a gas exchange, i.e. filling a gas into a cylinder and letting gas out, is possible only to a limited extent in a conventional internal combustion engine having cam-actuated valves, and cannot be optimized for all operating states. A gas fill denotes the charge of a combustion chamber of the cylinder with air, added fuel and, depending on the operating state and the type of internal combustion engine, a recirculated exhaust gas from the combustion.

The control of the gas exchange (also known as charge cycle) in a camless internal combustion engine differs in principle from this. In an internal combustion engine having an electrohydraulic, camless valve drive, the engine valve operations are flexible. The quantities of intake air and of residual exhaust gas in each cylinder can be controlled by varying the instant of the opening and/or closing of the intake and exhaust valves. While an electrohydraulic, camless valve drive offers more flexibility, on the other hand, disadvantages exist which do not occur in arrangements having mechanical camshafts.

In systems with fully variable valve timing, the lifting curve of the valve actuators exhibits certain tolerances from actuator to actuator. These deviations of the lifting curves are caused by tolerances of mechanical, hydraulic, magnetic or electrical components of the valve actuators. Furthermore, the lifting curves change due to different wear over time in an unequal manner.

However, different lifting curves produce filling differences between the individual cylinders. This leads to a deterioration in the smooth-running performance of the internal combustion engine, elevated noise emission, increased fuel consumption, and a greater stress on the moving parts of the internal combustion engine, which results in greater wear.

German Patent No.195 11 320 proposes the formation of cylinder-individual correction values for the solenoid-valve control of an electrohydraulic valve actuator. The fresh-gas and residual-exhaust-gas charge is ascertained from a fresh air measured individually for each cylinder and a combustion chamber pressure measured individually for each cylinder, as well as from a temperature, and is compared to pre-determined setpoint values. Thus, a balance of different lifting curves is achieved by suitable determination of the correction values.

To measure these quantities, German Patent No. 195 11 320 proposes using a single air-mass flow sensor in the intake flow and/or a single oxygen sensor in the exhaust-gas flow which is operated on a time-resolving basis. With the detected air quantity, the residual exhaust-gas portion can then be ascertained by offsetting against a combustion chamber pressure measured in a cylinder-individual manner, given a specific piston reference position and the temperature.

However, in the device disclosed in German Patent No. 195 11 320, it is necessary to ascertain the above-indicated measured quantities individually for each cylinder. Thus, it is necessary to arrange at least one combustion-chamber pressure sensor per cylinder. This is very costly, since a pressure sensor must be arranged with access to the combustion chamber of the cylinder. Moreover, the customary pressure sensors are temperature-sensitive, and output inaccurate measured values in response to changing temperatures.

German Published Patent Application No. 42 36 008 describes a cylinder-individual lambda closed-loop control for a system having variable valve timing. There, a lambda probe is used indirectly as filling sensor, in that the fresh-air charge of the cylinder is calculated back with the aid of the injection quantity. However, this device supplies inaccurate calculation values for the fresh-air charge, since because of the necessary rapid calculation, many influence factors such as a temperature of the internal combustion engine, a load status of the internal combustion engine, a combustion-chamber pressure and an ambient temperature cannot be sufficiently taken into account in the calculation. In addition, this device assumes injection valves with a very small tolerance in order to be able to calculate usable results for the fresh-air charge at all.

SUMMARY OF THE INVENTION

An object of the present invention is to specify a method and a device, which are simple and accurate, for controlling a gas fill of a plurality of cylinders in an internal combustion engine having variable valve timing.

In the method for controlling a gas fill of a plurality of cylinders in an internal combustion engine having variable valve timing, a multitude of sampling values of a detection signal of a filling sensor are ascertained by sampling the detection signal with a sampling rate. Furthermore, a first detection interval is determined for a first cylinder. In the following, those sampling values which are within the first detection interval for the first cylinder are summed up. This sum is designated as first sampling-value sum. In addition, the number of sampling values within the first detection interval is counted. This yields a first count value. A first air mass filled into the first cylinder is then ascertained by forming a quotient from the first sampling sum and the first count value.

The advantages attained with the invention are, in particular, that the first air mass filled into the first cylinder is ascertained in a simple manner based on one detection signal. This detection signal is the output signal of a filling sensor. Beyond the detection signal of the filling sensor, it is preferably not necessary in the method of the present invention to acquire further measured quantities such as a combustion-chamber pressure or a temperature. Furthermore, the method according to the invention supplies a precise gas fill, i.e. the first air mass filled into the first cylinder, even when inexact injection valves having great tolerances are used.

In one advantageous refinement of the invention, the first detection interval is variable.

Due to a change in the first detection interval, a selection may advantageously be made as to whether, for example, the detection signal of a filling sensor is evaluated upon opening of the valve or upon closing of the valve. It is thereby possible to determine whether the valve or the valve actuator exhibits more deviations or tolerances during opening or during closing, and whether the valve or the valve actuator has a defect.

In a further advantageous development of the invention, a second detection interval for a second cylinder of the plurality of cylinders of the internal combustion engine is determined. The sampling values within the second detection interval are then summed up for ascertaining a second sampling-value sum. Furthermore, the number of sampling values within the second detection interval are counted. The count value is designated as the second count value. An air mass filled into the second cylinder is then ascertained by forming a quotient from the second sampling-value sum and the second count value. In the following, a gas-fill difference between the first and the second cylinder is then ascertained by comparing the first air mass filled into the first cylinder to the second air mass filled into the second cylinder. A first gas-exchange actuator for actuating the intake valve of the first cylinder and a second gas-exchange actuator for actuating the second intake valve of the second cylinder are then controlled on the basis of this gas-fill difference.

This embodiment of the invention advantageously permits control of the two gas-exchange actuators of the first and of the second cylinder on the basis of the actual deviations of the two gas-exchange actuators, namely, on the basis of the gas-fill difference. The gas-fill difference can thus be minimized to improve the smooth running properties.

The device of the present invention includes a sampling device for ascertaining sampling values of a detection signal of a filling sensor by sampling the detection signal at a sampling rate; a first determination device for determining a first detection interval for a first cylinder of the plurality of cylinders; a first summing unit for summing sampling values which are within the first detection interval for the first cylinder, for ascertaining a first sampling-value sum; a first counter for counting a number of sampling values which are within the first sampling interval, for ascertaining a first count value; and a first divider for ascertaining a first air mass filled into the first cylinder by forming a quotient from the first sampling sum and the first count value.

The advantages attained with the invention lie particularly in the fact that only one filling sensor is required to ascertain a first air mass which was filled into the first cylinder. In other words, only one detection signal of one sensor is sampled, and the first air mass is ascertained on the basis of this signal. Consequently, the device of the present invention has a simple design which can be produced inexpensively. In addition, since only one filling sensor is provided, it is not necessary to take into account deviations between a plurality of filling sensors.

In one advantageous refinement of the invention, the first detection interval is variable.

Thus, a "detection window" can be formed in such a way that, for example, only an opening or closing of the valve is considered, and therefore it is possible to check whether tolerances of the valve or of the gas-exchange actuator are particularly great or particularly small upon opening or upon closing of the valve.

Another advantageous embodiment of the invention further includes a sampling-rate determination device for determining a sampling rate; a second determination device for determining a second detection interval for a second cylinder of the plurality of cylinders; a second summing unit for summing sampling values within the first detection interval, for ascertaining a second sampling-value sum; a second counter for counting a number of sampling values within the second detection interval, for ascertaining a second count value; a second divider for ascertaining a second air mass filled into the second cylinder by forming a quotient from the second sampling sum and the second count value; a first comparator for ascertaining a gas-fill difference between the first and the second cylinder by comparing the first air mass to the second air mass; and a control device for controlling a first gas-exchange actuator of the first cylinder and a second gas-exchange actuator of the second cylinder on the basis of the gas-fill difference.

This embodiment of the present invention advantageously permits triggering of the two gas-exchange actuators on the basis of the gas-fill difference between the two cylinders, so that gas-fill differences can be offset. This allows excellent smooth running of the internal combustion engine. A decrease in noise and pollutant emissions is also thereby attainable, as well as a reduction in fuel consumption. Thus, a fresh gas and residual exhaust gas charge which fluctuates from cylinder to cylinder can be compensated by cylinder-individual triggering of the gas-exchange actuators.

DETAILED DESCRIPTION

Figure 1:
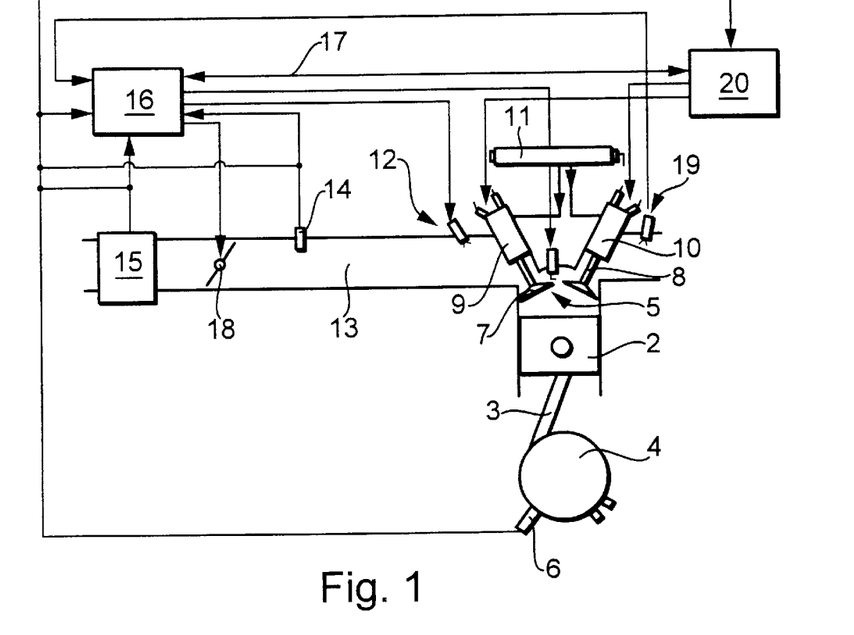
FIG. 1 shows a schematic representation of an internal combustion engine having a fully variable valve train.

FIG. 1 shows a schematic representation of a cylinder of an internal combustion engine 1 having a fully variable valve train. In a fully variable valve train, a phase and lift of the corresponding valve is alterable. Reference numeral 2 denotes a piston of a cylinder that is connected via a connecting rod 3 to a schematically represented crankshaft 4. Piston 2 bounds a combustion chamber of the cylinder. Arranged on crankshaft 4 is a crank-angle sensor 6 which detects a crank angle.

A spark plug 5 is arranged in the combustion chamber of the cylinder. The combustion chamber of the cylinder can be filled with gas via an intake valve 7 and emptied via an exhaust valve 8.

Intake valve 7 and exhaust valve 8 are opened or closed by a gas-exchange actuator 9 for intake valve 7 and a gas-exchange actuator 10 for the exhaust valve.

Reference numeral 11 designates a hydraulic pressure chamber which is connected to gas-exchange actuators 9 and 10 via hydraulic connections. A hydraulic fluid under pressure in hydraulic chamber 11 is applied to gas-exchange actuators 9 and 10 through the hydraulic connections.

Reference numeral 12 designates an injector for injecting fuel into an intake manifold 13 of internal combustion engine 1. Reference numeral 14 denotes an intake-manifold pressure sensor, and reference numeral 15 denotes a hot-film air-mass sensor. Hot-film air-mass sensor 15 is arranged in intake manifold 13 of internal combustion engine 1 in the air-flow direction upstream of a throttle valve 18. Throttle valve 18 is disposed in intake manifold 13 of internal combustion engine 1 to control an air flow in the intake manifold. The air flow direction in intake manifold 13 of the internal combustion engine goes from the hot-film air-mass sensor past throttle valve 18, past intake-manifold pressure sensor 14 configured in a wall of intake manifold 13, and past injector 12 which injects fuel into intake manifold 13. The gas mixture mixed with fuel is then admitted through intake valve 7 into the combustion chamber of internal combustion engine 1, compressed, ignited by spark plug 5, and then, through an upward movement of piston 2, is discharged through exhaust valve 8 which is opened for this purpose. The discharge air flow or exhaust air flow is then carried away past a lambda probe 19 into an exhaust (not shown).

Reference numeral 16 denotes a control unit which has the output signals of crank-angle sensor 6, lambda probe 19, hot-film air-mass sensor 15 and intake-manifold pressure sensor 14 as inputs. Engine control unit 16 is connected to a gas-exchange control device 20 via a bus 17, e.g. a Can bus.

Control unit 16 has a microprocessor device (not shown) and ascertains triggering signals for throttle valve 18, injector 12 and spark plug 5 from the input variables enumerated above.

Gas-exchange control device 20 has the output signals of crank-angle sensor 6, hot-film air-mass sensor 15 and intake-manifold pressure sensor 14 as input variables. As output signals, gas-exchange control device 20 outputs triggering signals for gas-exchange actuator 9 for intake valve 7, and for gas-exchange actuator 10 for exhaust valve 8. Gas-exchange control device 20 is also connected to control unit 16 via bus 17. Control unit 16 and gas-exchange control device 20 exchange signals via this bus 17 in order, for example, to synchronize a triggering of gas-exchange actuator 9 for intake valve 7 and a triggering of gas-exchange actuator 10 for exhaust valve 8 with an ignition of spark plug 5.

Although in FIG. 1, a throttle valve 18 is provided in intake manifold 13, the present invention is not restricted to an internal combustion engine 1 having a throttle valve 18. Furthermore, the present invention is not restricted to a non-supercharged internal combustion engine 1 having multipoint injection as is shown in FIG. 1, but is also applicable, without restrictions, to an internal combustion engine 1 having direct injection or turbocharging.

Figure 2:
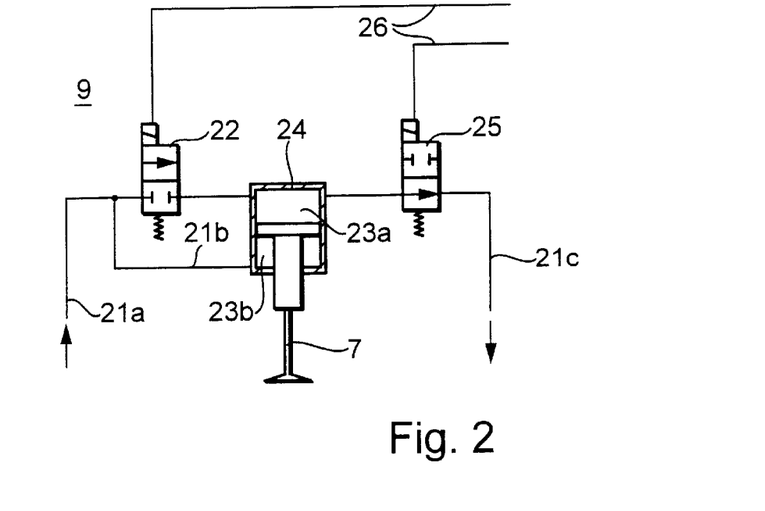
FIG. 2 shows a gas-exchange actuator.

With reference to FIG. 2, a functioning method of gas-exchange actuators 9 and 10 is now described in the following in terms of gas-exchange actuator 9 for intake valve 7. Although an electrohydraulic, fully variable valve train is depicted in FIG. 2 as example of a variable valve timing, the present invention is not limited to it, but rather is applicable in the same manner to, for example, piezo systems, as well. The invention is also applicable to electromagnetic valve timings, electrohydraulic valve timings and mechanical controls such as Vanos in conjunction with a variable valve train (VVT), i.e. a fully variable valve train with camshaft.

Reference numeral 22 designates a first solenoid valve. First solenoid valve 22 is arranged in a hydraulic connection 21a between hydraulic pressure chamber 11, which, for example, is formed as a common rail, and a first chamber 23a in an actuating device 24. A valve foot of intake valve 7 is disposed in actuating device 24. The valve foot is displaceably arranged in actuating device 24. The valve foot separates first chamber 23a from a second chamber 23b in actuating device 24.

A second hydraulic connection 21b is provided between second chamber 23b in actuating device 24 and hydraulic pressure chamber 11. First chamber 23a is further connected via a second solenoid valve 25 to hydraulic pressure chamber 11 through a third hydraulic connection 21c.

First solenoid valve 22 and second solenoid valve 25 are connected to gas-exchange control device 20 via lines 26. Gas-exchange control device 20 actuates first solenoid valve 22 and second solenoid valve 23 by corresponding triggering signals.

The operation of gas-exchange actuator 9 shown in FIG. 2 is as follows. When first solenoid valve 22 is opened, a hydraulic medium under pressure flows from hydraulic pressure chamber 11 into first chamber 23a. The hydraulic medium fills first chamber 23a and displaces the valve foot which separates first chamber 23a from second chamber 23b. Intake valve 7 in FIG. 2 is thereby moved downward. Valve 7 is arranged such that intake valve 7 sits in a valve seat (not shown) in a cylinder head of internal combustion engine 1; when the valve foot in FIG. 2 is completely at the top, i.e. no hydraulic medium is in first chamber 23a, first chamber 23a has a minimal space and second chamber 23b has a maximum space. In this position, intake valve 7 closes the intake opening of the combustion chamber of the cylinder. When first chamber 23a is filled with the hydraulic medium, intake valve 7 is moved out of the valve seat into the combustion chamber of the cylinder, and the intake opening of the cylinder is opened. When a desired valve lift is reached, first solenoid valve 22 is closed.

To close intake valve 7, second solenoid valve 25 is opened so that the hydraulic medium in first chamber 23a can flow back through open second solenoid valve 25 to hydraulic pressure chamber 11. The hydraulic medium from hydraulic pressure chamber 11 fed under pressure to second chamber 23b then flows into second chamber 23b and thereby shifts the valve foot in FIG. 2 upward. Thus, intake valve 7 is transferred back into the valve seat and the intake opening of the combustion chamber is closed.

Gas-exchange actuators of this type permit individual valve triggering for each exhaust valve and each intake valve of the spark ignition engine.

Figure 3:
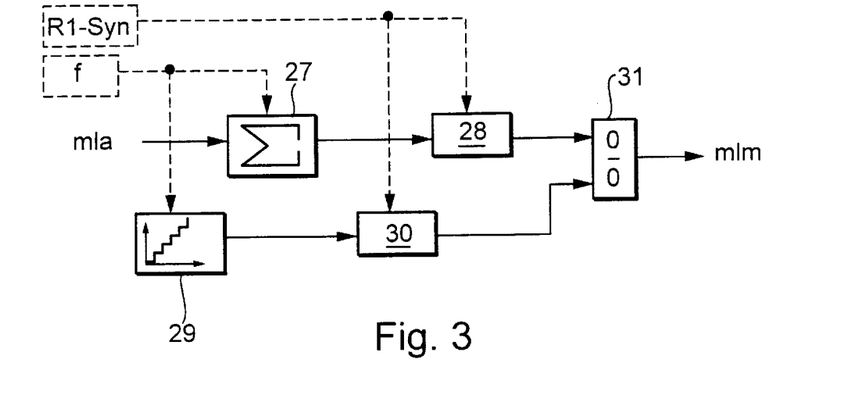
FIG. 3 shows a diagram for clarifying the present invention.

The principle of the present invention shall now be further clarified with reference to FIG. 3. Although the present invention is described in the following with reference to a hot-film air-mass sensor and an intake-manifold pressure sensor, according to the invention, a lambda probe may also be used as filling sensor. In this context, the air quantity supplied to the corresponding cylinder is calculated from the composition of the exhaust gases exhausted from exhaust valve 8.

Reference numeral 27 in FIG. 3 denotes a summing unit that is connected to a storage device 28. Storage device 28 is connected to a divider 31. Reference numeral 29 designates a counter which is connected to a further storage device 30, that in turn is connected to divider 31. The elements indicated with dotted lines in FIG. 3 designate function features.

First of all, a detection signal mla is acquired in FIG. 3. Preferably, the output signal mlhfma of hot-film air-mass sensor 15 is used as detection signal mla. Since this sensor is highly dynamic, the air mass flowing into intake manifold 13 can be dynamically measured, that is to say, individual pulsations can be detected. In this way, the fresh charge flowing into the internal combustion engine can be directly measured.

Furthermore, the fresh charge can also be detected using intake-manifold pressure sensor 14. In this case, output signal mlpsa of intake-manifold pressure sensor 14 is used as detection signal mla. Since intake-manifold pressure sensors are very dynamic, individual pulsations can likewise be detected by this way of measuring. Since, however, when working with intake-manifold pressure sensors, the pressure is measured, here it is a case of an indirect measurement of the fresh air, in which both temperature influences and influences of the residual exhaust gas such as an exhaust backpressure must be taken into account.

Detection signal mla is sampled with a sampling rate f, and sampling values $mla_{Rtx}$ are added up in summing unit 27 from a beginning of a detection interval R1-Syn to the end of detection interval R1-Syn, and are then stored in storage device 28. In other words, this means that all sampling values $mla_{Rtx}$ within detection interval R1-Syn are added up in summing unit 27. Moreover, counter 29 is used to determine how many sampling values $mla_{R1-Syn}$ are within first detection interval R1-Syn and were added up in summing unit 27. The result of the count is then stored in further storage device 30. Summed sampling values $mla_{R1-Syn}$ in storage device 28 are designated as sampling value sum AW1, and the count value stored in storage device 30 is designated as count value Z1. A quotient is then formed from sampling value sum AW1 and count value Z1 in divider 31. The quotient is air mass mlm averaged over detection interval R1-Syn and supplied to the cylinder.

If detection interval R1-Syn extends over the entire intake stroke of one working cycle of the internal combustion engine, it is possible to detect the total air mass supplied to the respective cylinder.

Figure 4:
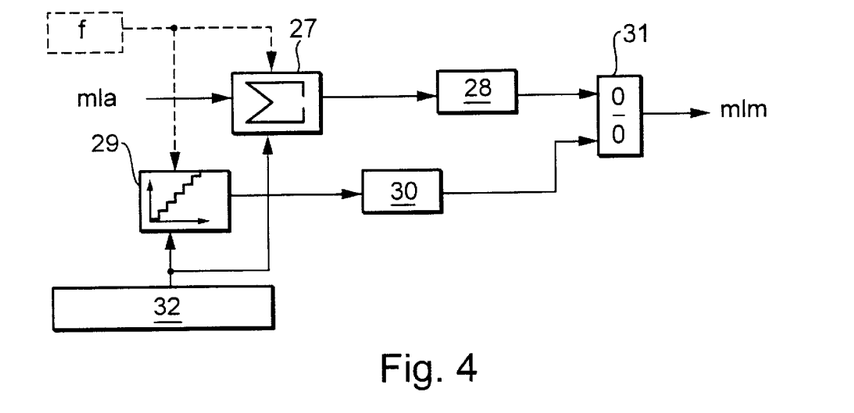
FIG. 4 shows a diagram for clarifying the present invention.

With reference to FIG. 4, the principle of the present invention shall now be described when detection interval R1-Syn is defined by crank-angle positions. Identical reference numerals as in FIG. 3 designate identical or corresponding devices, so that reference is made to the description with respect to FIG. 3 for a description of these devices.

First of all, detection signal mla is sampled with a sampling rate f in the same manner as was described with reference to FIG. 3. In FIG. 4, reference numeral 32 denotes a crank-angle sensor which detects a first predetermined crankshaft position and a second predetermined crankshaft position, and upon detecting the first predetermined crankshaft position, outputs a first signal to counter 29 and summing unit 27, and upon detecting the second predetermined crankshaft position, outputs a second signal to counter 29 and summing unit 27. The first predetermined crankshaft position marks the beginning of detection interval R1-Syn. The second predetermined crankshaft position marks the end of detection interval R1-Syn. With the receipt of the first signal from crank-angle sensor 32, counter 29 begins to count the number of sampling values $mla_{R1-Syn}$.

With the receipt of the first signal from crank-angle sensor 32, summing unit 27 begins to add up sampling values $mla_{R1-Syn}$. With the receipt of the second signal from crank-angle sensor 32, summing unit 27 outputs the addition result to storage device 28. Storage device 28 then stores the addition result output by summing unit 27. This addition result is sampling-value sum AW1.

With the receipt of the second signal from crank-angle sensor 32, counter 29 outputs the counter reading to storage device 30. Storage device 30 stores the counter reading of counter 29. The stored counter reading then corresponds to first count value Z1. With the aid of divider 31, air mass mlm filled into the corresponding cylinder is then ascertained in the same manner as was described with reference to FIG. 3.

If the principle described with reference to FIGS. 3 and 4 is applied to an internal combustion engine 1 having a plurality of cylinders, it is necessary to define a separate detection interval or corresponding crank-angle positions for each cylinder. If the intention is to detect filling differences between cylinders, it is necessary that the detection intervals of the cylinders to be compared have the same length and the same position with respect to the crank angle. If a total air mass supplied to the internal combustion engine during one working cycle is to be detected, it is requisite that each detection interval for a cylinder include its entire intake stroke. Moreover, in this case it is necessary to define a detection interval for each cylinder of the internal combustion engine and to detect the air mass supplied to the cylinder in the manner described above. By adding the air masses ascertained for the individual cylinders, it is then possible to calculate the total air mass for one working cycle.

In the following, an exemplary embodiment of a device for controlling a gas fill of a first and a second cylinder in an internal combustion engine having variable valve timing according to the present invention is described with reference to FIG. 5. Preferably, the devices shown in FIG. 5, with the exception of intake-manifold pressure sensor 14, hot-film air-mass sensor 15 and an ambient pressure sensor 34 in gas-exchange control device 20 are arranged in FIG. 1.

Reference numeral 35 designates a sampling device for ascertaining sampling values $mla_{Rtx}$ of detection signal mla of intake-manifold pressure sensor 14 or hot-film air-mass sensor 15 by sampling detection signal mla with sampling rate f. Sampling device 35 is further connected to a throttling determination device 36, a sampling-rate determination device 37, a first and a second summing unit 39 and 43, and a first and a second counter 40 and 44.

Throttling determination device 36 is connected to intake-manifold pressure sensor 14 and ambient pressure sensor 34, in addition to sampling device 35. Throttling determination device 36 is preferably a divider and determines throttling ps/pu as the quotient of an intake manifold pressure pu detected by intake-manifold pressure sensor 14 and an ambient pressure ps detected by ambient pressure sensor 34. The throttling determination device outputs a throttling ps/pu to sampling device 35.

Sampling device 35 includes a switching device which, when the throttling, i.e. the quotient of intake manifold pressure and ambient pressure is greater than a threshold (e.g. 0.8), switches in such a way that detection signal mla of hot-film air-mass sensor 15 is sampled, and when the quotient is less than or equal to a threshold (e.g. 0.8), switches in such a way that detection signal mla of intake-manifold pressure sensor 14 is sampled.

Sampling-rate determination device 37 determines a sampling rate f as a function of engine parameters, such as the speed, a crank angle, an engine temperature, a load demand, etc. To that end, sampling-rate determination device 37 exchanges appropriate data or measured values with control unit 16 via bus 17. However, it is also possible to design the sampling-rate determination device with a multivibrator having adjustable frequency.

Reference numeral 38 designates a first determination device 38. First determination device 38 is designed for determining a first detection interval R1-syn for the first cylinder. First determination device 38 determines a length and a position of detection interval R1-syn relative to the crank angle, as a function of at least the speed of internal combustion engine 1. Preferably, first determination device 38 determines the length and the position of detection interval R1-syn as a function of engine parameters such as the speed, an intake manifold pressure and valve time data. First determination device 38 receives the engine parameters for determining detection interval R1-syn from control unit 16 via bus 17.

First determination device 38 outputs the length and the position of determined detection interval R1-syn with the aid of a first signal that indicates the beginning of detection interval R1-syn and a second signal that indicates the end of detection interval R1-syn, to a first summing unit 39 and a first counter 40.

From the receipt of the first signal from first determination device 38, which indicates the beginning of detection interval R1-syn, first summing unit 39 sums up sampling values $mla_{R1\text{-}syn}$, output by sampling device 35, until the receipt of the second signal from first determination device 38 which indicates the end of detection interval R1-syn. First summing unit 39 then outputs the addition result, designated as sampling value sum AW1, to a first divider 41.

After receipt of the first signal from first determination device 38, first counter 40 begins to count sampling values $mla_{R1\text{-}syn}$ output by sampling device 35. First counter 40 counts until first determination device 38 outputs the second signal indicating the end of detection interval R1-syn. First counter 40 then outputs the counter result, designated as count value Z1, to first divider 41.

First divider 41 then ascertains a quotient from sampling sum AW1 and first count value Z1, which corresponds to a first air mass mlm1 filled into the first cylinder.

In the same manner, second determination device 42, second summing unit 43, second counter 44 and second divider 45 determine a second air mass mlm2 for the second cylinder. Second determination device 42, second summing unit 43, second counter 44 and second divider 45 have the same design and the same functioning method as first determination device 38, first summing unit 39, first counter 40 and first divider 41, so that for a detailed description regarding this, reference is made to these devices.

First divider 41 and second divider 45 output respective ascertained air masses mlm1 and mlm2 to a first comparator 46 which compares the two ascertained air masses to one another. First comparator 46 outputs the comparison result to a triggering device 47 which triggers a first gas-exchange actuator of the first cylinder and a second gas-exchange actuator of the second cylinder on the basis of the gas-fill difference output by first comparator 46. Triggering device 47 preferably triggers the gas-exchange actuators in such a way that a gas-fill difference is minimized during the next working cycles of internal combustion engine 1. For the control of the gas fill of more than two cylinders, the device must be expanded in corresponding manner.

Figure 5:
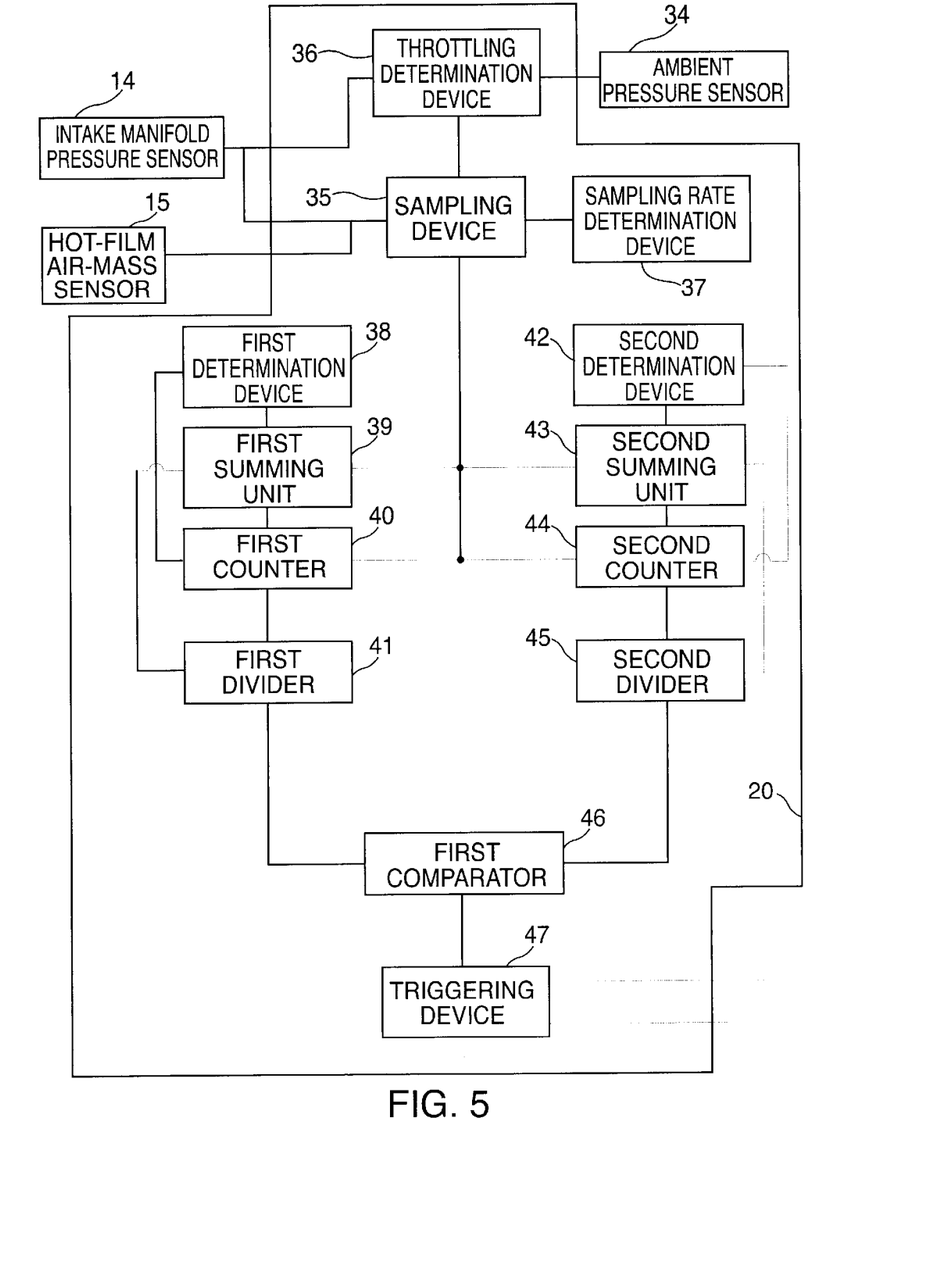
FIG. 5 shows a first exemplary embodiment of the present invention.

In the following, an exemplary embodiment of the functioning method of the device shown in FIG. 5 is described with reference to the flowchart in FIG. 6.

After the start in step S1, sampling-rate determination device 37 determines a sampling rate f in step S2 and outputs it to sampling device 35.

In step S3, the sampling device ascertains sampling values $mla_{Rtx}$ by sampling detection signal mla of a filling sensor (i.e. of intake-manifold pressure sensor 14 or hot-film air-mass sensor 15) with sampling rate f. Sampling device 35 outputs sampling values $mla_{Rtx}$ to first summing unit 39, first counter 40, second summing unit 43 and second counter 44.

In step S4, first determination device 38 determines first detection interval R1-syn for the first cylinder. The length and position of detection interval R1-syn relative to the crank angle is variable. However, the maximum detection-interval length should amount to a maximum of 720° arc of crankshaft rotation:number of cylinders, that is to say, should not be greater than the angular ignition spacing between two cylinders. However, as described above, in the individual case, shorter detection-interval lengths can also be advantageous, when specific timing windows are to be analyzed or when filling differences should be analyzed at specific points of time. Both the position and the length of detection interval R1-syn are determined depending on various parameters such as the speed, the intake manifold pressure and valve time data, and are therefore variable and a function of a plurality of engine parameters.

During first detection interval R1-syn, in step S5, first summing unit 39 sums up sampling values $mla_{R1\text{-}syn}$, within first detection interval R1-syn for ascertaining first sampling-value sum AW1. The beginning and the end of detection interval R1-syn are indicated to first summing unit 39 by first determination device 38.

In step S6, first counter 40 counts the number of sampling values $mla_{R1\text{-}syn}$ within first detection interval R1-syn for ascertaining first count value Z1. The beginning and the end of first detection interval R1-syn are indicated to first counter 40 by first determination device 38.

In step S7, first divider 41 ascertains first air mass mlm1 filled into the first cylinder by forming the quotient of first sampling sum AW1, which was ascertained by first summing unit 39, and count value Z1 which was ascertained by first counter 40.

In step S8, second determination device 42 determines a second detection interval R2-syn for a second cylinder, in the same manner as first determination device 38 in step S4.

In step S9, second summing unit 43 sums up sampling values $mla_{R2\text{-}syn}$ within second detection interval R2-syn, output by sampling device 35, for ascertaining a second sampling-value sum AW2. The beginning and the end of second detection interval R2-syn are indicated to second summing unit 43 by second determination device 42.

In step S10, second counter 44 counts the number of sampling values $mla_{R2\text{-}syn}$ within second detection interval R2-syn for ascertaining second count value Z2. The beginning and the end of second detection interval R2-syn are indicated to second counter 44 by second determination device 42.

In step S11, second divider 45 ascertains second air mass mlm2 filled into the second cylinder by forming a quotient of second sampling sum AW2, which was determined by second summing unit 43, and second count value Z2 which was determined by second counter 44.

In step S12, first comparator 46 compares first air mass mlm1, ascertained by first divider 41, to second air mass mlm2 ascertained by second divider 45, and outputs the comparison result to triggering device 47.

In step S13, triggering device 47 adapts a control of the first gas-exchange actuator of the first cylinder, and of the second gas-exchange actuator of the second cylinder on the basis of the gas-fill difference which was determined with the aid of first comparator 46. To that end, triggering device 47 adapts a triggering of the corresponding gas-exchange actuators which is predefined, for example, by control unit 16, in such a way that a gas-fill difference is minimized in the following working cycle of internal combustion engine 1. The processing is brought to an end in step S14. This processing is carried out cyclically during the operation of internal combustion engine 1. For the control of the gas fill when working with more than two cylinders, the described method must be expanded in corresponding manner.

Figure 6:
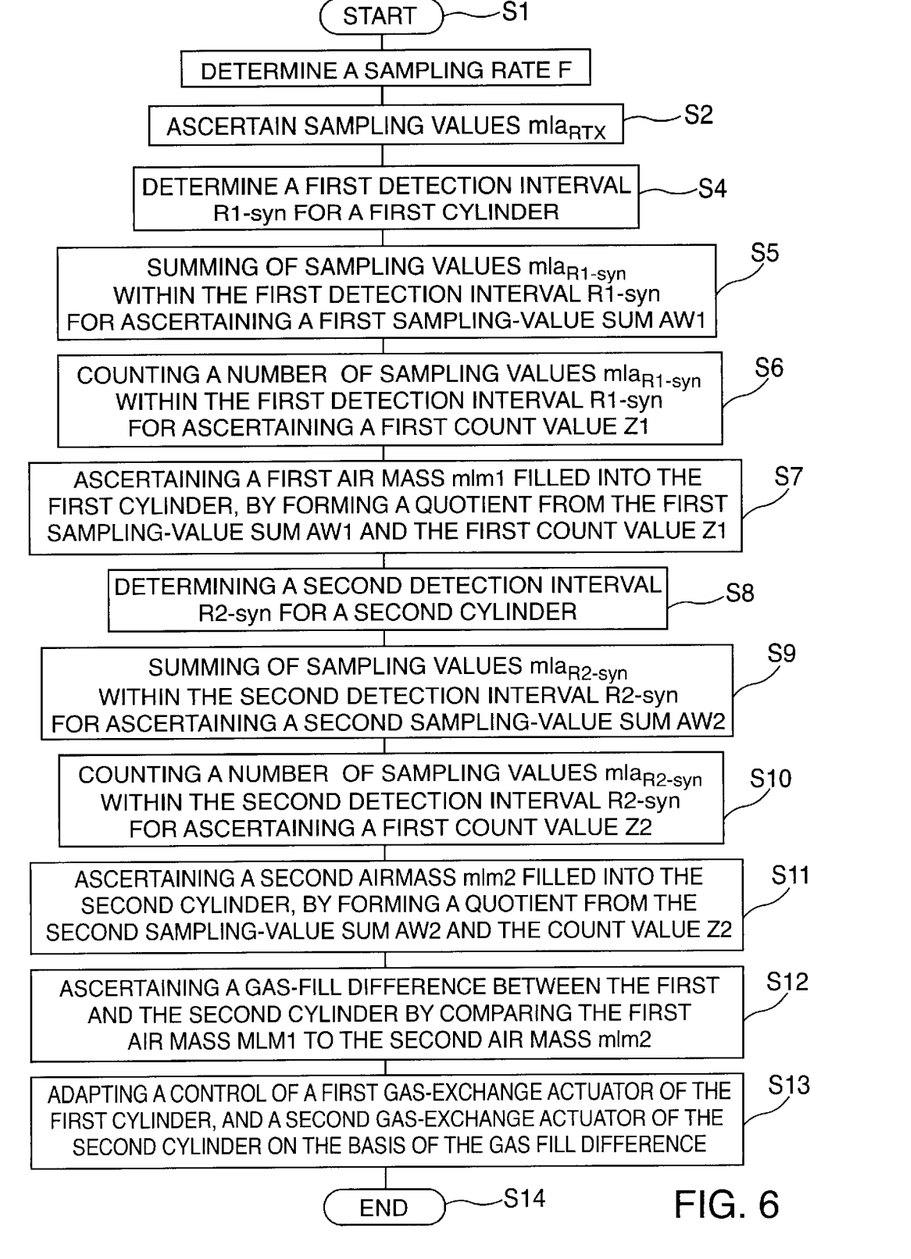
FIG. 6 shows a flowchart illustrating an exemplary embodiment of the functioning method of the device in FIG. 5.
Figure 7:
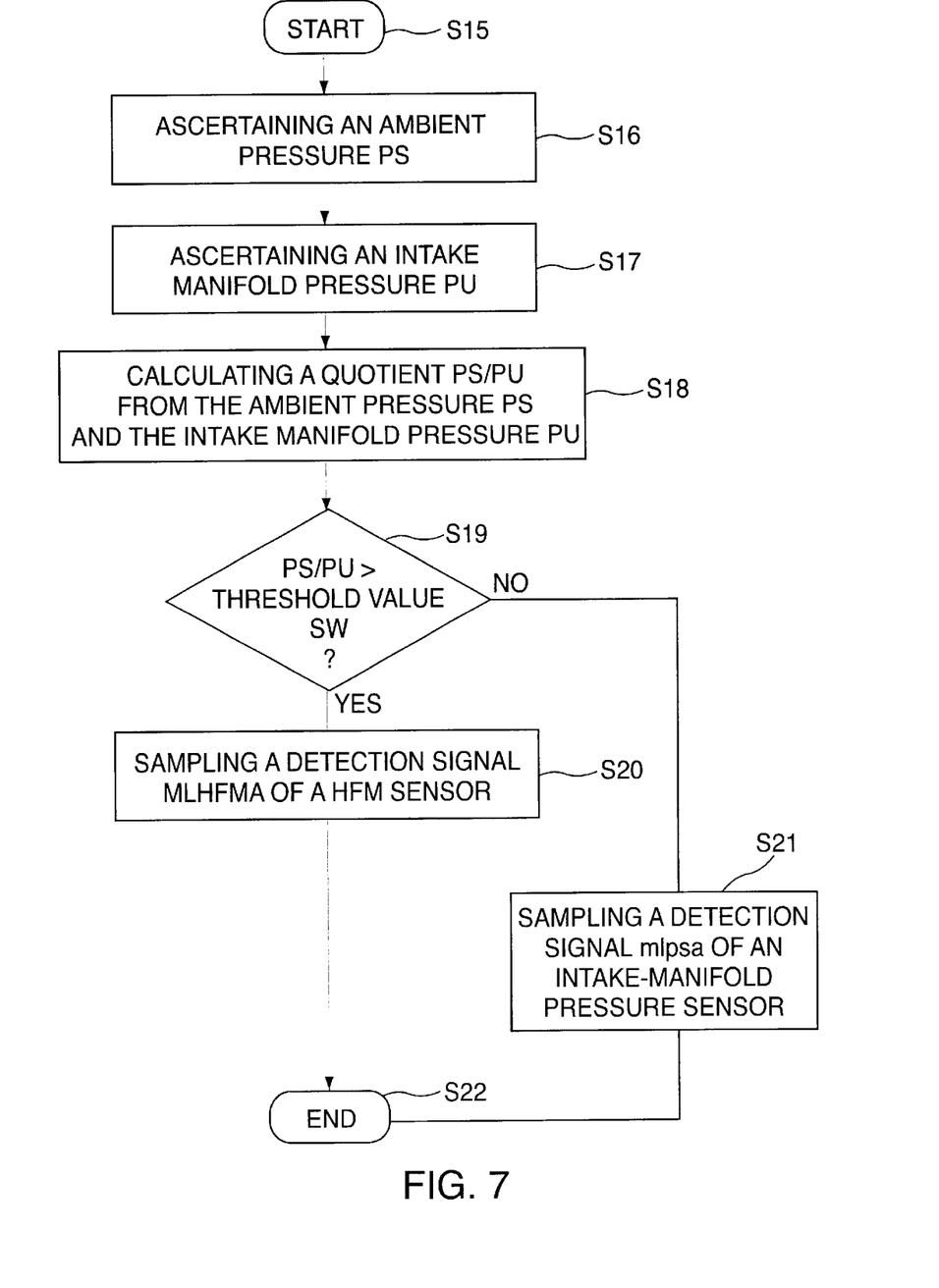
FIG. 7 shows a flowchart showing step S3 of FIG. 6 in greater detail.

The processing described in step S3 in FIG. 6 is now further described with reference to FIG. 7.

After the start in step S15, ambient-pressure sensor 34 ascertains an ambient pressure ps of internal combustion engine 1 and outputs a corresponding signal to throttling determination device 36.

In step S17, an intake manifold pressure pu is determined with the aid of intake-manifold pressure sensor 14.

In step S18, throttling determination device 16 calculates a quotient ps/pu from ambient pressure ps and intake manifold pressure pu.

In step S19, the calculated quotient, namely, throttling ps/pu is compared to a threshold value SW. The threshold value is preferably 0.8. If quotient ps/pu is greater than threshold value SW, in step S20, sampling device 35 samples output signal mlhfma of hot-film air-mass sensor 15. The processing then goes on to step S22, and then continues in the same manner as described in FIG. 6, with step S4.

If it is determined in step S19 that quotient ps/pu is less than or equal to threshold value SW, the processing goes on to step S21 and sampling device 35 samples output signal mlpsa of intake-manifold pressure sensor 14. The processing then goes on to step S22, and then, as was described with reference to FIG. 6, goes on to step S4.

In the following, with reference to FIGS. 8 and 9, it is explained why above a threshold value SW of throttling ps/pu, detection signal mlpsa of an intake-manifold pressure sensor 14 is sampled, and above this threshold value SW, detection signal mlhfma of hot-film air-mass sensor 15 is sampled.

Figure 8:
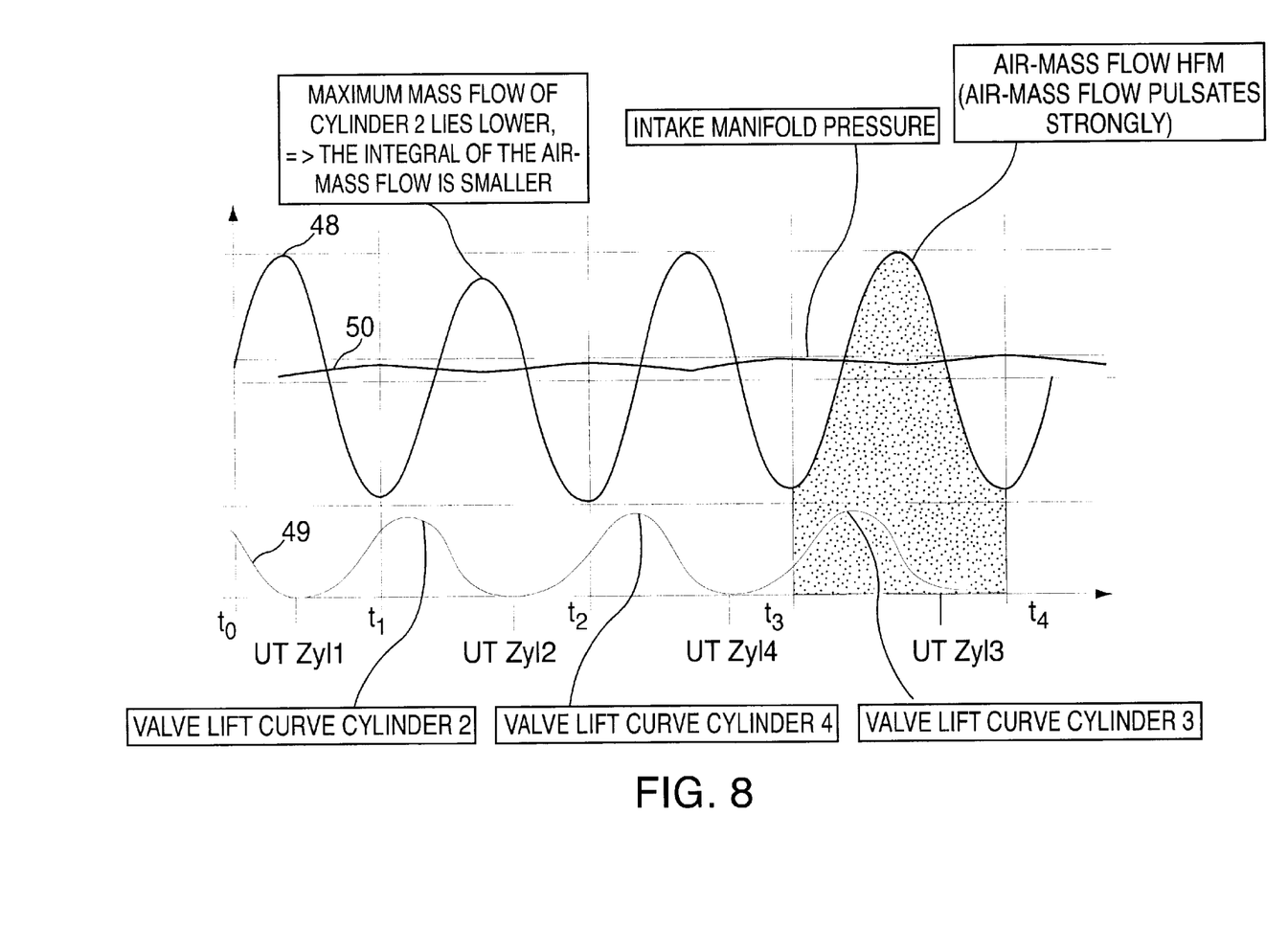
FIG. 8 shows a mass-flow characteristic, a valve lift curve and an intake-manifold pressure characteristic of an internal combustion engine at 1200/min and intake manifold pressure=0.95×ambient pressure.

Reference numeral 48 in FIG. 8 designates the characteristic of the mass flow in intake manifold 13 of an internal combustion engine 1 having 4 cylinders with the firing sequence 1, 2, 4, 3, as it is ascertained by hot-film air-mass sensor 15. Line 49 in FIG. 8 denotes a valve-lift curve of the intake valve of the four cylinders. From instant t0 to instant t1, curve 49 represents the valve-lift curve of cylinder 1, from instant t1 to instant t2 the valve-lift curve of cylinder 2, from instant t2 to instant t3 the valve-lift curve of cylinder 4, and from instant t3 to instant t4 the valve-lift curve of cylinder 3.

As is evident from FIG. 8, mass flow 48 has a first maximum at the instant of the bottom dead center of cylinder 1, UT Zyl1, a second maximum at the instant of the bottom dead center of second cylinder UT Zyl2, a third maximum at the instant of the bottom dead center of fourth cylinder UT Zyl4, and a fourth maximum at the instant of the bottom dead center of the third cylinder. A comparison of the second maximum of mass flow 48 to the three other maxima shows that the mass flow for the second cylinder is less, that is to say, the integral of the air-mass flow is smaller.

Reference numeral 50 in FIG. 8 designates the intake-manifold pressure characteristic as is detected by intake-manifold pressure sensor 14. Intake-manifold pressure ps is plotted in FIG. 8 in pressure units per time.

As the characteristic of the intake manifold pressure from instant t0 to instant t4 shows, intake manifold pressure 50 runs relatively constant and, in the case of cylinder 2 between instant t1 and t2, shows no significant difference compared to the other cylinders between instants t0 to t1 and t2 to t4. Accordingly, in the present invention, given ps/pu>SW, output signal mlhfma of hot-film air-mass sensor 15 is sampled as detection signal mla. Advantageously, this would permit a precise cylinder-individual detection of the corresponding air mass.

Figure 9:
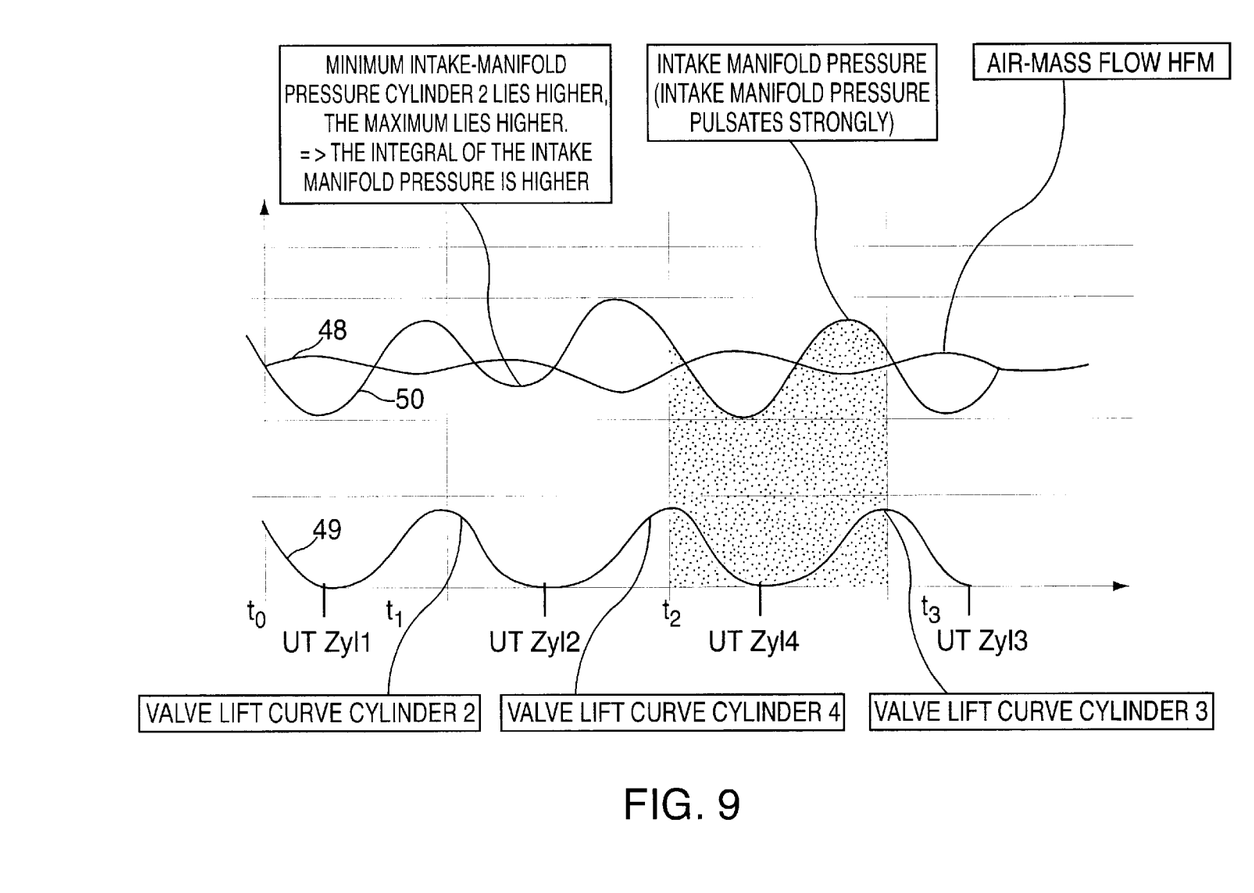
FIG. 9 shows a mass-flow characteristic, a valve lift curve and an intake manifold pressure at 1200/min and an intake manifold pressure=0.5×ambient pressure.

FIG. 9 shows mass-flow characteristic 48, valve-lift curve 49 and intake manifold pressure characteristic 50 at 1200/min, given an average intake-manifold pressure of approximately 0.5×the ambient pressure. The conditions are the same as in internal combustion engine 1 in FIG. 8, so that reference is made to it for a detailed description.

As in FIG. 8, cylinder 2 siphons less air mass than the other cylinders. A comparison of an integral from instant t1 to instant t2, to the corresponding integral from t2 to t3 (shown in black) shows the integral of intake manifold pressure pu in the case of the second cylinder between t1 and t2 is greater than the integral of intake manifold pressure pu from instant t2 to instant t3 of the fourth cylinder. The filling difference can be easily determined on the basis of this comparison. In comparison thereto, given these engine conditions, i.e. given this throttling ps/pu, the mass flow detected by hot-film air-mass sensor 15 shows no significant difference between the integral of mass flow 48 from instant t1 to instant t2, and the integral of mass flow 48 from instant t2 to instant t3. Accordingly, in the present invention, given ps/pu≦SW, output signal mlpsa of intake-manifold pressure sensor 14 is sampled as detection signal mla. Advantageously, this would permit a precise cylinder-individual detection of the corresponding air mass.

Because of an intake-manifold storage effect, it may be that the integral of a cylinder which follows a cylinder having a smaller inducted air mass is also easily increased. For such cases, it is possible in the device provided in FIG. 5, to provide a compensation device (not shown) which suppresses detection of the following gas fills of the following cylinders until the first deviation has been compensated, and only then releases the detection again.

In summary, it can be gathered from FIGS. 8 and 9 that, given a slight throttling, for example, at ps/pu greater than 0.8, gas-fill differences between cylinders are preferably detected with hot-film air-mass sensor 15. In this context, the length and the position of the detection interval are to be adapted as a function of parameters such as the speed, the intake manifold pressure and valve time data in order to detect filling differences in optimal manner and at the desired points of time.

Given a stronger throttling, i.e.given ps/pu less than 0.8, the detection signal of intake-manifold pressure sensor 14 is preferably to be used for detecting gas-fill differences between cylinders. The length and the position of the detection interval are to be determined as a function of various engine parameters such as the speed, the intake manifold pressure and valve time data.

In one variant of the present exemplary embodiment, the beginning of the detection interval and the end of the detection interval are shifted in time as a function of quotient ps/pu. As the quotient ps/pu becomes lower, the beginning of the detection interval and the end of the detection interval are preferably retarded. As has already been described, using the present invention, the gas fill of a cylinder may be detected in a cylinder-individual manner with the aid only of hot-film air-mass sensor 15, as well. Since, however, as was shown with reference to FIGS. 8 and 9, below a throttling threshold value ps/pu, a precise detection of filling differences is made more difficult because of slight integration differences, the intake manifold pressure is preferably approximated by a model when using any hot-film air-mass sensor 15. Such a model is made, for example, of a program map of intake manifold pressures as a function of specific engine parameters, from which a suitable intake manifold pressure can be read out with the aid of the corresponding engine parameters.

What is claimed is:

1. A method for controlling a gas fill of a plurality of cylinders in an internal combustion engine having variable valve timing, comprising the steps of:

ascertaining sampling values of a detection signal of a filling sensor by sampling the detection signal with a sampling rate;

determining a first detection interval for a first cylinder of the plurality of cylinders;

summing up those sampling values that are within the first detection interval for the first cylinder in order to ascertain a first sampling-value sum;

counting a number of the sampling values that are within the first detection interval in order to ascertain a first count value; and ascertaining a first air mass filled into the first cylinder by forming a quotient from the first sampling-value sum and the first count value.

2. The method according to claim 1, wherein:

the first detection interval is variable.

3. The method according to claim 1, further comprising the steps of:

determining a second detection interval for a second cylinder of the plurality of cylinders;

summing up of those sampling values that are within the second detection interval for the second cylinder in order to ascertain a second sampling-value sum;

counting a number of the sampling values that are within the second detection interval in order to ascertain a second count value;

ascertaining a second air mass filled into the second cylinder by forming a quotient from the second sampling-value sum and the second count value;

ascertaining a gas-fill difference between the first cylinder and the second cylinder by comparing the first air mass to the second air mass; and controlling a first gas-exchange actuator of the first cylinder and a second gas-exchange actuator of the second cylinder on the basis of the gas-fill difference.

4. The method according to claim 3, wherein:

a position of the first detection interval relative to a crank angle of the internal combustion engine is variable, and the position of the first detection interval is ascertained as a function of an engine parameter.

5. The method according to claim 4, wherein:

a length of the first detection interval is variable, and the length of the first detection interval is ascertained as a function of the engine parameter.

6. The method according to claim 5, wherein:

a position of the second detection interval relative to the crank angle of the internal combustion engine is variable, and the position of the second detection interval is ascertained as a function of the engine parameter.

7. The method according to claim 6, wherein:

a length of the second detection interval is variable, and the length of the second detection interval is ascertained as a function of the engine parameter.

8. The method according to claim 1, further comprising the step of:

as a function of a throttling in an intake manifold of the internal combustion engine, sampling as the detection signal one of an output signal of a hot-film air-mass sensor and an output signal of the fill sensor.

9. The method according to claim 7, wherein:

the engine parameters includes one of a speed of the internal combustion engine, an intake manifold pressure, and a valve time datum.

10. The method according to claim 8, further comprising the step of:

ascertaining the throttling in accordance with an intake manifold pressure and an ambient pressure.

11. The method according to claim 8, further comprising the steps of:

calculating the throttling as the quotient of an intake manifold pressure and an ambient pressure;

when the quotient of the intake manifold pressure and the ambient pressure is greater than a threshold value, sampling the output signal of the hot-film air-mass sensor as the detection signal; and when the quotient of the intake manifold pressure and the ambient pressure is no more than the threshold value, sampling the output signal of the fill sensor as the detection signal.

12. A device for controlling a gas fill of a plurality of cylinders in an internal combustion engine having variable valve timing, comprising:

a sampling device for ascertaining sampling values of a detection signal of a filling sensor by sampling the detection signal with a sampling rate;

a first determination device for determining a first detection interval for a first cylinder of the plurality of cylinders;

a first summing unit for summing up those sampling values that are within the first detection interval for the first cylinder in order to ascertain a first sampling-value sum;

a first counter for counting a number of the sampling values that are within the first detection interval in order to ascertain a first count value; and a first divider for ascertaining a first air mass filled into the first cylinder by forming a quotient from the first sampling-value sum and the first count value.

13. The device according to claim 12, wherein:

the first detection interval is variable.

14. The device according to claim 12, further comprising:

a sampling-rate determination device for determining a sampling rate;

a second determination device for determining a second detection interval for a second cylinder of the plurality of cylinders;

a second summing unit for summing up of those sampling values that are within the second detection interval for the second cylinder in order to ascertain a second sampling-value sum;

a second counter for counting a number of the sampling values that are within the second detection interval in order to ascertain a second count value;

a second divider for ascertaining a second air mass filled into the second cylinder by forming a quotient from the second sampling-value sum and the second count value;

a first comparator for ascertaining a gas-fill difference between the first cylinder and the second cylinder by comparing the first air mass to the second air mass; and a triggering device for controlling a first gas-exchange actuator of the first cylinder and a second gas-exchange actuator of the second cylinder on the basis of the gas-fill difference.

15. The device according to claim 14, wherein:

the first determination device determines a position of the first detection interval relative to a crank angle of the internal combustion engine in a variable manner and as a function of an engine parameter.

16. The device according to claim 15, wherein:

the first determination device determines a length of the first detection interval in a variable manner and as a function of the engine parameter.

17. The device according to claim 16, wherein:

the second determination device determines a position of the second detection interval relative to the crank angle of the internal combustion engine in a variable manner and as a function of the engine parameter.

18. The device according to claim 17, wherein:

the second determination device determines a length of the second detection interval in a variable manner and as a function of the engine parameter.

19. The device according to claim 18, wherein:

as a function of a throttling in an intake manifold of the internal combustion engine determined by a throttling determination device, the sampling device samples one of an output signal of a hot-film air-mass sensor and an output signal of the fill sensor as the detection signal.

20. The device according to claim 18, wherein:

the engine parameter includes one of a speed of the internal combustion engine, an intake-manifold pressure, and a valve time datum.

21. The device according to claim 19, wherein:

the throttling-determination device determines the throttling on the basis of an intake-manifold pressure and an ambient-pressure.

22. The device according to claim 19, wherein:

the throttling determination device includes a third divider, the throttling device determines the throttling as a quotient of an intake manifold pressure and an ambient pressure, when the quotient of the intake manifold pressure and the ambient pressure is greater than a threshold value, the sampling device samples the output signal of the hot-film air-mass sensor as the detection signal, and when the quotient of the intake manifold pressure and the ambient pressure is no more than the threshold value, the sampling device samples the output signal of the fill sensor as the detection signal.

* * * * *